(12) United States Patent
Yoo et al.

(10) Patent No.: US 11,850,884 B2
(45) Date of Patent: Dec. 26, 2023

(54) HUB BUILT-IN TYPE CONSTANT VELOCITY APPARATUS

(71) Applicants: Hyundai Motor Company, Seoul (KR); Kia Motors Corporation, Seoul (KR); Hyundai Wia Corporation, Changwon-si (KR)

(72) Inventors: Sung Su Yoo, Whasung-Si (KR); Won Jun Choi, Whasung-Si (KR); Hee Il Kim, Whasung-Si (KR); Chang Hee Jeong, Whasung-Si (KR); Yeong Wook Cho, Whasung-Si (KR); Bum Jae Lee, Whasung-Si (KR)

(73) Assignees: Hyundai Motor Company, Seoul (KR); Kia Motors Corporation, Seoul (KR); Hyundai Wia Corporation, Changwon-si (KR)

( * ) Notice: Subject to any disclaimer, the term of this patent is extended or adjusted under 35 U.S.C. 154(b) by 488 days.

(21) Appl. No.: 17/088,838

(22) Filed: Nov. 4, 2020

(65) Prior Publication Data
US 2021/0362544 A1    Nov. 25, 2021

(30) Foreign Application Priority Data
May 20, 2020    (KR) .................. 10-2020-0060043

(51) Int. Cl.
*B60B 27/00* (2006.01)
*F16D 3/84* (2006.01)
*F16D 3/16* (2006.01)

(52) U.S. Cl.
CPC ...... *B60B 27/0047* (2013.01); *B60B 27/0021* (2013.01); *B60B 27/0073* (2013.01); *F16D 3/16* (2013.01); *F16D 3/845* (2013.01); *B60B 2900/1212* (2013.01); *B60B 2900/211* (2013.01); *B60B 2900/511* (2013.01);
(Continued)

(58) Field of Classification Search
CPC ............ B60B 27/0047; B60B 27/0021; B60B 27/0073; B60B 2900/1212; B60B 2900/211; B60B 2900/511; F16D 3/16; F16D 3/845; F16D 2300/08; F16D 2300/12; Y10S 464/906
USPC ......................................................... 464/178
See application file for complete search history.

(56) References Cited

U.S. PATENT DOCUMENTS 4,094,376 A    6/1978   Welschof
4,764,153 A *  8/1988   Jacob ..................... F16C 33/60
                                                              464/178
(Continued)

FOREIGN PATENT DOCUMENTS

KR    10-1871992 B1    6/2018

*Primary Examiner* — Greg Binda
(74) *Attorney, Agent, or Firm* — MORGAN, LEWIS & BOCKIUS LLP

(57) ABSTRACT

A hub built-in type constant velocity apparatus includes a hub housing with a constant velocity joint coupled inwardly, an internal race coupled to an external circumferential surface of the hub housing, and a pre-load ring coupled to the external circumferential surface of the hub housing and located on a side of the internal race, wherein an end portion of the hub housing is formed to be rolled upwards toward the pre-load ring to form a forming portion coupled to the pre-load spring for applying pressure to the pre-load ring and the internal race.

17 Claims, 9 Drawing Sheets

(52) U.S. Cl.
CPC ...... *F16D 2300/08* (2013.01); *F16D 2300/12* (2013.01); *Y10S 464/906* (2013.01)

(56) References Cited

U.S. PATENT DOCUMENTS

| | | | |
|---|---|---|---|
| 6,981,800 B2* | 1/2006 | Shibuya | F16D 3/223 384/544 |
| 7,621,817 B2 | 11/2009 | Cermak | |

* cited by examiner

ΦD1 > ΦD2

ΦD1: DIAMETER OF FIRST SEATING PORTION
ΦD2: DIAMETER OF SECOND SEATING PORTION

HUB BUILT-IN TYPE CONSTANT VELOCITY APPARATUS

CROSS REFERENCE TO RELATED APPLICATION

The present application claims priority to Korean Patent Application No. 10-2020-0060043, filed on May 20, 2020, the entire contents of which is incorporated herein for all purposes by this reference.

BACKGROUND OF THE INVENTION

Field of the Invention

The present invention relates to a constant velocity apparatus, and more particularly, to a hub built-in type constant velocity apparatus incorporating torque transmission and a load bearing function by integrating a hub housing and an external race of a constant velocity apparatus.

Description of Related Art

In general, a hub and a bearing are mounted on a tire wheel connected to a driving axle are used to withstand a load in up and down and front and rear directions of a vehicle and a horizontal load when the vehicle turns. Furthermore, a constant velocity apparatus is mounted on the driving axle of the vehicle and used to transmit power transmitted from a transmission to a wheel. The constant velocity apparatus, the hub, and the bearing are organically assembled by a fastening member and used as one unit.

Meanwhile, the constant velocity apparatus is a component that performs transmitting a driving force from an engine (motor) to the wheel, and the constant velocity apparatus and a wheel-side hub bearing are coupled by a spline. However, problems such as joints, backlash, nut loosening, and the like arise at a coupling portion between the constant velocity apparatus and the hub bearing at the time of power transmission.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a hub built-in type constant velocity apparatus configured for improving a problem of quality between boundary parts and reducing a weight by integrating a wheel hub and an external race of a constant velocity joint and configured for improving traveling performance through articulation angle improvement by reducing a distance between a wheel center and a constant velocity joint center.

According to various exemplary embodiments of the present invention, a hub built-in type constant velocity apparatus includes: a hub housing with a constant velocity joint coupled inwardly; an internal race coupled to an external circumferential surface of the hub housing; and a pre-load ring coupled to the external circumferential surface of the hub housing and located on a side of the internal race, wherein an end portion of the hub housing is formed to be rolled upwards toward the pre-load ring to form a forming portion coupled to the pre-load spring for applying pressure to the pre-load ring and the internal race.

The hub built-in type constant velocity apparatus may further include: a boot coupled to an external circumferential surface of the pre-load ring, wherein a coupling structure may be formed on each of the external circumferential surface of the pre-load ring and an internal circumferential surface portion of the boot coupled with the pre-load ring.

A plurality of teeth may be formed on an internal circumferential surface of the pre-load ring to prevent the pre-load ring from rotating on the external circumferential surface of the hub housing.

The boot may be accommodated on the external circumferential surface of the pre-loading ring and an upper end portion of the forming portion, and a sealing portion may be formed in at least one of a direction of one surface of the forming portion and a direction of a surface on which the pre-loading ring and the forming portion are in contact with each other inside the boot.

The sealing portion may include: a first sealing portion extending in an axial direction of the pre-load ring from a surface of the boot abutting on one surface of the forming portion inside the boot and formed to abut on one side surface of the forming portion; and a second sealing portion formed inwards from the interior of the boot and extending toward a point in which the pre-load ring and the forming portion are in contact with each other.

A first seating portion on which the internal race is accommodated and a second seating portion on which the pre-load ring is accommodated may be provided on the external circumferential surface of the hub housing, and a step may be formed between the first seating portion and the second seating portion.

A step may be formed in a portion of the pre-load ring in contact with the internal race, and the step formed in the pre-load ring may correspond to a step formed between the first seating portion and the second seating portion.

A low friction washer may be located between the internal race and the pre-load ring.

The low friction washer may be fixed to the pre-load ring.

A low friction structure for reducing a frictional force with the internal race may be formed on a surface of the pre-load ring abutting on the internal race.

The internal race and the pre-load ring may be formed of different materials.

A value obtained by dividing an outermost diameter of the pre-load ring by an external diameter of the forming portion may be 0.8 to 1.2.

A value obtained by dividing a thickness of the pre-load ring by a thickness of the forming portion may be 1.2 to 1.6.

A value obtained by dividing an internal diameter of the pre-load ring by a total length of the pre-load ring may be 5 to 7.

A value obtained by dividing an external diameter of the forming portion by an internal diameter of the pre-load ring may be 1.1 to 1.4.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
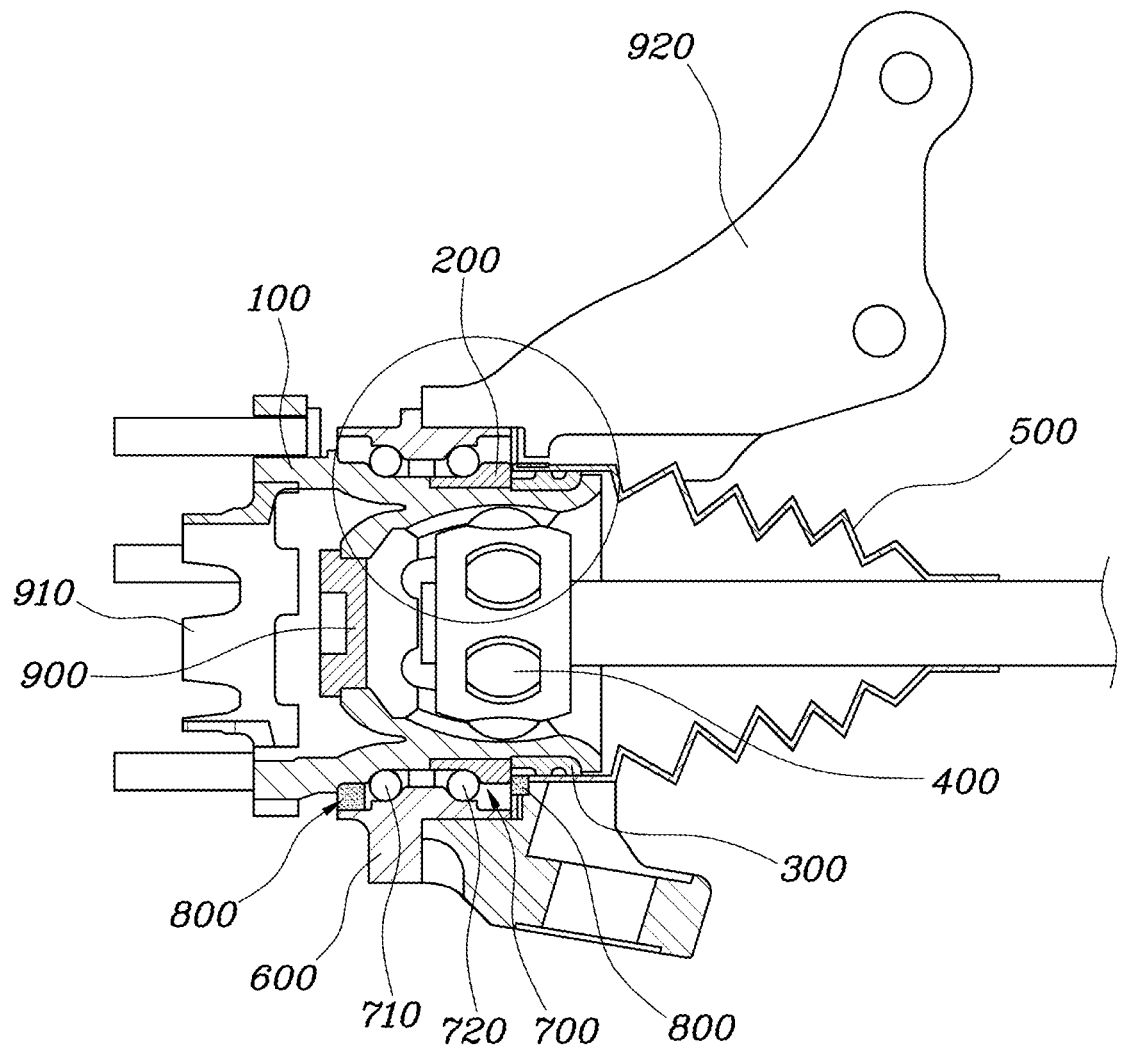
FIG. 1 is a view exemplarily illustrating an overall configuration of a hub built-in type constant velocity apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a hub built-in type constant velocity apparatus according to exemplary embodiments of the present invention is described with reference to the accompanying drawings.

In particular, various exemplary embodiments of the present disclosure will be explained with reference to FIGS. 1-13.

As illustrated in FIG. 1, the hub built-in type constant velocity apparatus according to various exemplary embodiments of the present invention may include one or more of a hub housing 100, an internal race 200, an external race 600, a pre-load ring 300, a constant velocity joint 400, a boot 500, a wheel bearing 700, a sealing device 800, a hub cap 900 and a wheel guide 910.

The hub housing 100, in which a wheel hub and an external race of the constant velocity joint 400 are integrated, is provided with the constant velocity joint 400 coupled to inside thereof to transfer driving torque transferred from an engine to a wheel. At the same time, the hub housing 100 may also serve as an internal race of the wheel bearing 700 to support a load of the vehicle.

Accordingly, by forming the hub housing 100 by integrating the wheel hub and the external race of the constant velocity joint 400, the center portion of the constant velocity joint 400 may move to the outside of the vehicle, increasing a length of a driveshaft, and as a result, an articulation angle of the driveshaft of the constant velocity joint 400 may be improved.

Furthermore, by forming the hub housing 100 by integrating the wheel hub and the external race of the constant velocity joint 400, a connection member between the related art wheel hub and the constant velocity joint may be eliminated to reduce weight and manufacturing cost, improve driving fuel efficiency through a weight reduction, improve a noise problem due to the connection member, and improve a quality problem due to loosening of the wheel hub nut that fixes the constant speed joint housing and the wheel hub.

Figure 2:
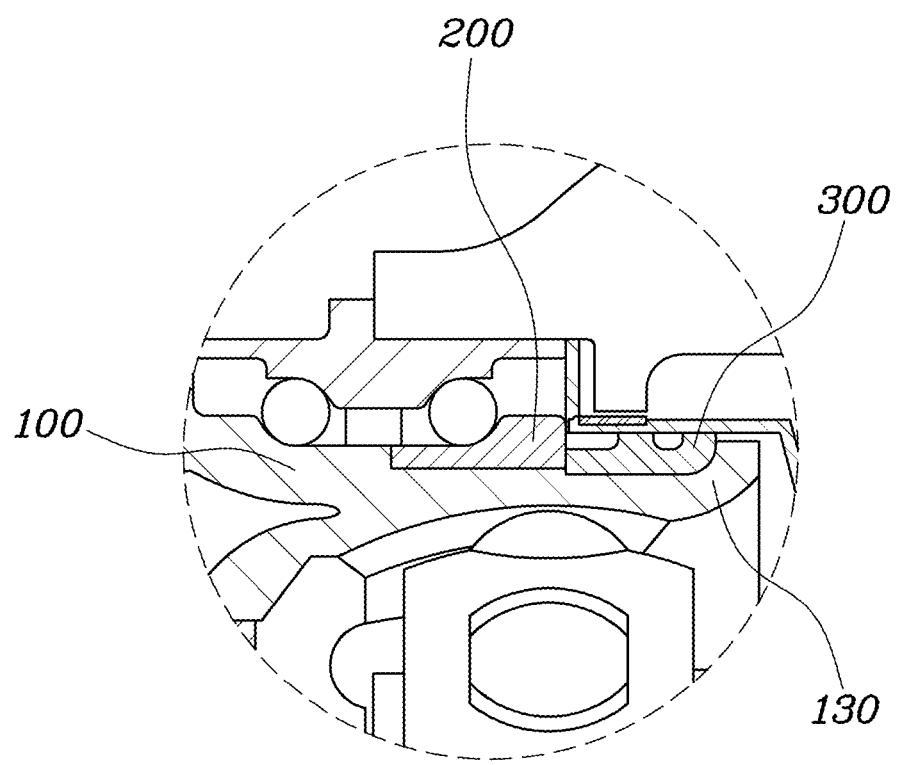
FIG. 2 is a view exemplarily illustrating that an internal race and a pre-load ring are pre-loaded by a forming portion formed at a hub housing in the hub built-in type constant velocity apparatus according to various exemplary embodiments of the present invention.

As shown in FIG. 2, the hub housing 100 may have a forming portion 130 provided at one end portion and rolled toward the pre-load ring 300 to apply pressure to the pre-load ring 300 and the internal race 200 coupled to an external circumferential surface of the hub housing 100. Here, the forming portion 130 may be formed by an orbital forming method. A pre-load may be applied to the internal race 200 of the wheel bearing 700 by the forming portion 130 provided in the hub housing 100. Here, the pre-load may refer to a magnitude based on which some of components configuring the wheel bearing assembly are compressed and elastically deformed by a predetermined force applied in an axial direction during an assembly process.

The internal race 200 may be press-fit to the external circumferential surface of the hub housing 100 and may rotate together with the hub housing 100. Furthermore, the internal race 200 is configured as an internal track of the wheel bearing 700.

The external race 600 may be disposed spaced apart from the hub housing 100 and the internal race 200, and is configured as an external track of the wheel bearing 700. Furthermore, the external race 600 is coupled to a knuckle 920. As the external race 600 is coupled with the knuckle 920, the external race 600 may be a non-rotation element whose position is not moved.

A first rolling element 710 and a second rolling element 720 may be located between the hub housing 100 and the external race 600 and between the external race 600 and the internal race 200 as shown in FIG. 1. The first rolling element 710 and the second rolling element 720 may be balls or rollers according to an exemplary embodiment and may rotate on the external circumferential surfaces of the external race 600 and the hub housing 100 and track portions of the external race 600 and the internal race 200.

The sealing device 800 is configured to prevent foreign matter from entering the wheel bearing 700 and is configured to prevent internal grease from leaking.

The hub cap 900 is configured to prevent grease in the constant velocity joint 400 from leaking and to prevent foreign matter from flowing into the constant velocity joint 400.

The wheel guide 910 is configured as an assembly guide for the wheel and a disk and is configured to maintain a center position of a rotating body.

The constant velocity joint 400 is configured to transfer a driving force transmitted through the engine and the transmission to the hub housing 100.

The boot 500 is configured to prevent grease from leaking inside the constant velocity joint 400 and is configured to prevent foreign matter from flowing into the constant velocity joint 400.

Hereinafter, a structure of the pre-load ring 300 which is a core feature of the present invention, a structure of the external circumferential surface of the hub housing 100 on which the pre-load ring 300 is accommodated, and a structure of the boot 500 coupled to the pre-load ring 300 will be described in more detail.

The pre-load ring 300 may be coupled to the external circumferential surface of the hub housing 100 and may be located on a side of the internal race 200 as shown in FIG. 2. Here, the pre-load ring 300 may be coupled to the external circumferential surface of the hub housing 100 through assembling, press-fitting, or the like.

Figure 3:
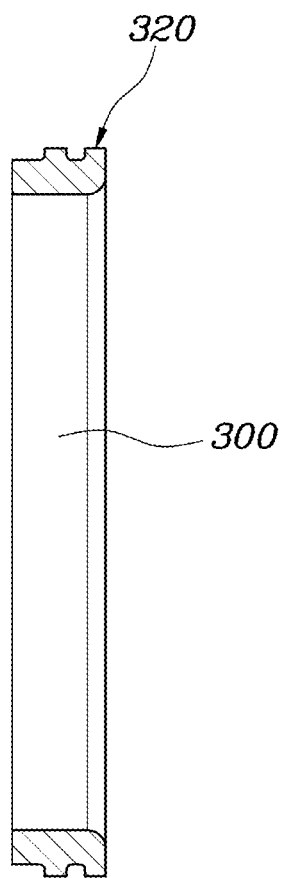
FIG. 3 is a view exemplarily illustrating a coupling structure formed on an external circumferential surface of a pre-load ring in a hub built-in type constant velocity apparatus according to various exemplary embodiments of the present invention.

The boot 500 may be coupled to an external circumferential surface of the pre-load ring 300, and a coupling structure for coupling with the boot 500 may be formed on the external circumferential surface of the pre-load ring 300. Similarly, a coupling structure may also be formed on an internal circumferential surface portion of the boot 500 coupled with the pre-load ring 300. According to various exemplary embodiments of the present invention, a protrusion 320 may be formed on the external circumferential surface of the pre-load ring 300 along the external circumferential surface as shown in FIG. 3, and a recess corresponding to a shape of the protrusion may be provided on an internal circumferential surface of the boot 500. According to another exemplary embodiment of the present invention, a recess may be formed on the external circumferential surface of the pre-load ring 300 and a protrusion corresponding to a shape of the recess may be formed on an internal surface of the boot 500 corresponding to the recess portion formed on the external circumferential surface of the pre-load ring 300. However, this is only various exemplary embodiments of the present invention, and a shape of the coupling structure formed on the external circumferential surface of the pre-load ring 300 and the internal circumferential surface portion of the boot 500 coupled with the pre-load ring 300 is not limited thereto.

Figure 4:
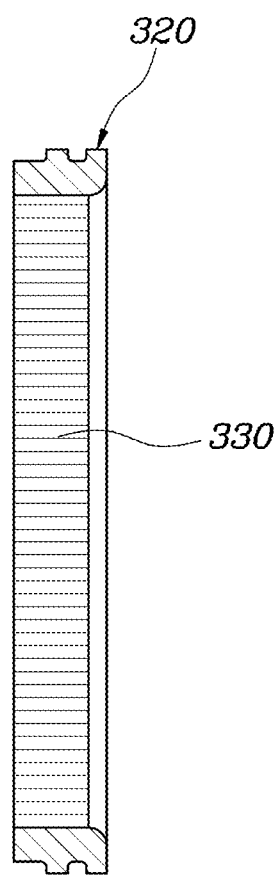
FIG. 4 is a view exemplarily illustrating a plurality of teeth formed on an internal circumferential surface of a pre-load ring in a hub built-in type constant velocity apparatus according to various exemplary embodiments of the present invention.

Referring to FIG. 4, a plurality of teeth 330 may be formed on the internal circumferential surface of the pre-load ring 300 to prevent the pre-load ring 300 from rotating on the external circumferential surface of the hub housing 100. According to various exemplary embodiments of the present invention, a serration configured for preventing rotation of the pre-load ring 300 on the external circumferential surface of the hub housing 100 may be provided on the internal circumferential surface of the pre-load ring 300.

If the pre-load ring 300 coupled to the external circumferential surface of the hub housing 100 rotates, the boot 500 coupled to an upper end portion of the pre-load ring 300 may be deformed, and as the boot 500 is deformed, sealing properties of the boot 500 may be lowered to cause a problem in which a grease or the like accommodated in the constant velocity joint 400 may leak. To prevent such a problem, in various exemplary embodiments of the present invention, a plurality of teeth may be provided on the internal circumferential surface of the pre-load ring 300 so that the pre-load ring 300 may be stably fixed to the external circumferential surface of the hub housing 100 and prevented from rotating, whereby deformation of the boot 500 and resultant leakage of grease may be improved.

Figure 5:
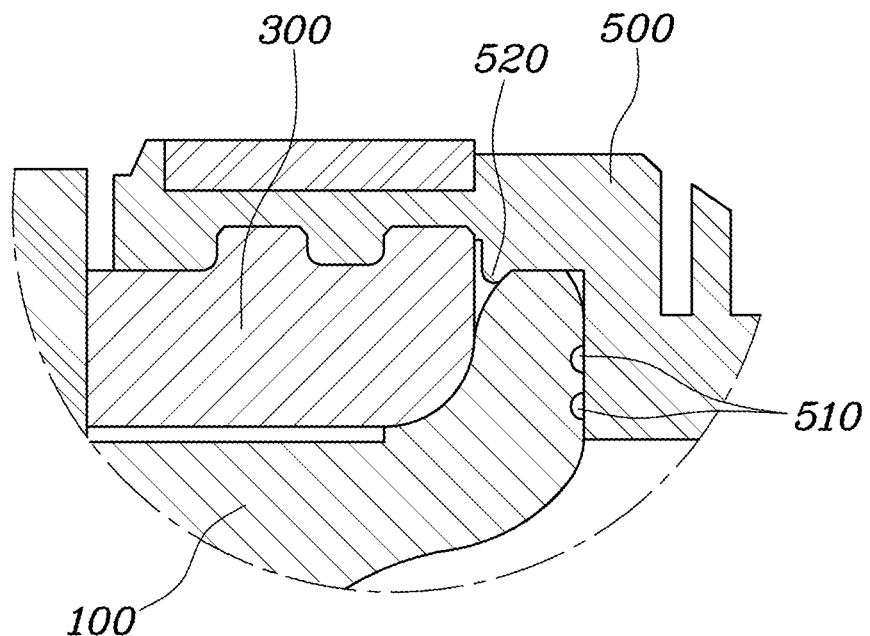
FIG. 5 is a view exemplarily illustrating a sealing portion formed at a boot in a hub built-in type constant velocity apparatus according to various exemplary embodiments of the present invention.

Referring to FIG. 5, the boot 500 is accommodated on the external circumferential surface of the pre-load ring 300 and an upper end portion of the forming portion 130. Sealing portions 510 and 520 may be formed in at least one direction among a direction of one surface of the forming portion 130 and a direction in which the pre-load ring 300 and the forming portion 130 are in contact with each other.

The sealing portion may include a first sealing portion 510 elongated in an axial direction of the pre-load ring from a surface abutting on one surface of the forming portion 130 inside the boot 500 to abut on one surface of the forming portion 130 and a second sealing portion 520 formed in an internal diameter direction from the interior of the boot 500 and elongated in a surface direction in which the pre-load ring 300 and the forming portion 130 are in contact with each other.

For example, when a load having a predetermined magnitude or greater, including torque, axial load, and lateral force, is applied to the hub housing 100, the sealing properties of the forming portion 130 may be lowered, and if the sealing properties of the forming portion 130 is lowered, the grease accommodated in the boot 500 may penetrate between the forming portion 130 and the pre-load ring 300, and as a result, rotation of the pre-load ring 300 may be promoted to cause the boot 500 to be deformed and resultantly cause the grease accommodated in the boot 500 to be leaked.

To solve the problem described above, in various exemplary embodiments of the present invention, the first sealing portion 510 elongated in the axial direction from a surface abutting on one surface of the forming portion 130 from the interior of the boot 500 to abut on one surface of the forming portion 130 and the second sealing portion 520 elongated in the direction of the surface in which the pre-load ring 300 and the forming portion 130 are in contact with each other are provided inside the boot.

As described above, in various exemplary embodiments of the present invention, since the first sealing portion 510 and the second sealing portion 520 are provided inside the boot 500, even if a load having a predetermined magnitude or greater is applied to the hub housing 100 to degrade sealing properties of the forming portion 130, leakage of the grease in the boot 500 is primarily prevented by the first sealing portion 510, and even if grease passes through the first sealing portion 510, penetration of the grease leaked through the second sealing portion 520 to the pre-load ring 300 may be prevented.

Figure 6:
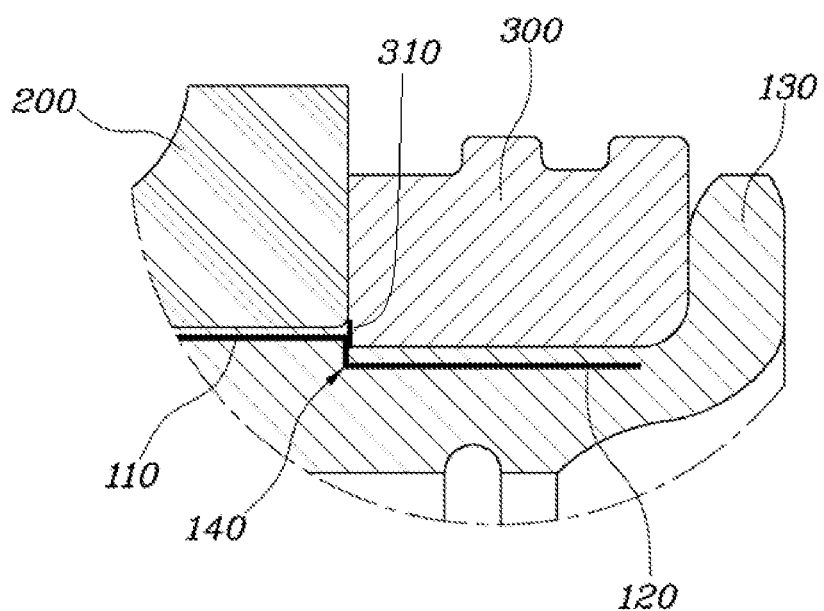
FIG. 6 is a view exemplarily illustrating a state in which an internal race and a pre-load ring are accommodated on a first seating portion and a second seating portion of a hub housing in a hub built-in type constant velocity apparatus according to various exemplary embodiments of the present invention.
Figure 7:
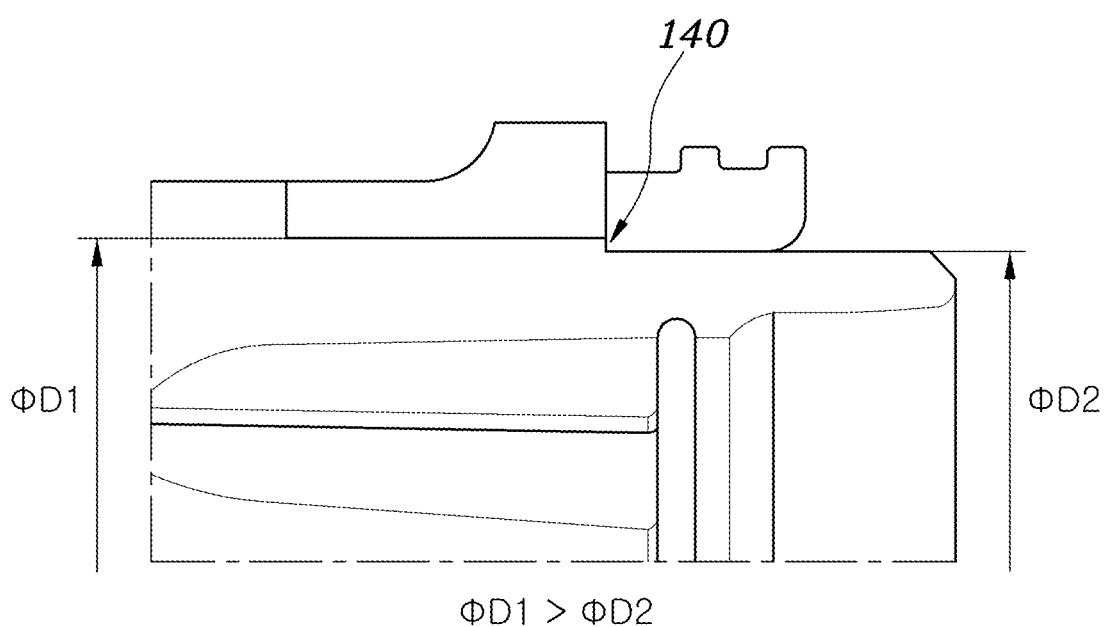
FIG. 7 is a view exemplarily illustrating a step structure formed at a first seating portion and a second seating portion in a hub built-in type constant velocity apparatus according to various exemplary embodiments of the present invention.

Meanwhile, a first seating portion 110 on which the internal race 200 is accommodated and a second seating portion 120 on which the pre-load ring 300 is accommodated may be provided on the external circumferential surface of the hub housing 100. Referring to FIG. 6 and FIG. 7, a step 140 may be formed between the first seating portion 110 and the second seating portion 120. As illustrated in FIG. 7, a diameter of the first seating portion 110 is preferably greater than a diameter of the second seating portion 120.

Here, the reason for forming the step 140 between the first seating portion 110 and the second seating portion 120 by making the diameter of the first seating portion 110 greater than the diameter of the second seating portion 120 is to make fitting force of the pre-load ring 300 greater than fitting force of the internal race 200 when the internal race 200 and the pre-load ring 300 are press-fit and mounted to the external circumferential surface of the hub housing 100.

When the internal race 200 is press-fit and mounted to the external circumferential surface of the hub housing 100, if the fitting force is greater than a predetermined level, the groove formed in the hub housing 100 may be excessively deformed. That is, the groove formed in the hub housing 100 may be excessively deformed if the internal race 200 is press-fit with a fitting force applied to press-fit the pre-load ring 300 to the external circumferential surface of the hub housing 100.

To solve the present problem, in various exemplary embodiments of the present invention, a step 140 is provided between the first seating portion 110 on which the internal race 200 is accommodated and the second seating portion 120 on which the pre-load ring 300 is accommodated, whereby different fitting forces may be applied to the internal race 200 and the pre-load ring 300, respectively.

Figure 10:
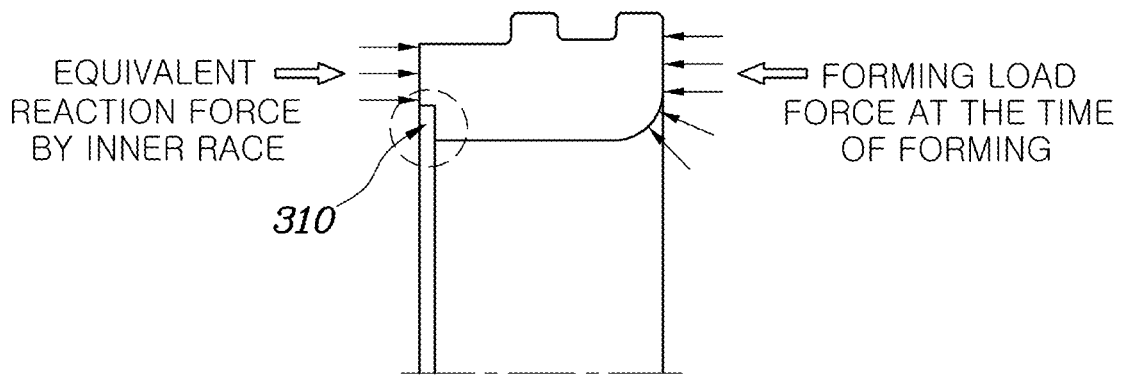
FIG. 10 is a view exemplarily illustrating a step structure formed at a pre-load ring in a hub built-in type constant velocity apparatus according to various exemplary embodiments of the present invention.

Meanwhile, referring to FIG. 10, the pre-load ring 300 may have a step 310 in a portion in contact with the internal race 200. Here, the step 310 formed on the pre-load ring 300 may correspond to the step 140 formed between the first seating portion 110 and the second seating portion 120.

Here, the reason for forming the step 310 in the portion in contact with the internal race 200 in the pre-load ring 300 is to make a reaction force based on the internal race 200 press-fit to the hub-housing 100 and a load force based on a forming force at the time of forming the end portion of the hub housing be balanced.

If the forming force at the time of forming the end portion of the hub housing 100 is greater than the reaction force based on the internal race 200, there is a problem that the internal race 200 is deformed and cracks may occur in the internal race 200. To improve the present problem, in various exemplary embodiments of the present invention, by forming the step 310 in the portion of the pre-load ring 300 in contact with the internal race 200, the reaction force based on the internal race 200 and the forming force at the time of forming may be balanced in the axial direction thereof.

Figure 8:
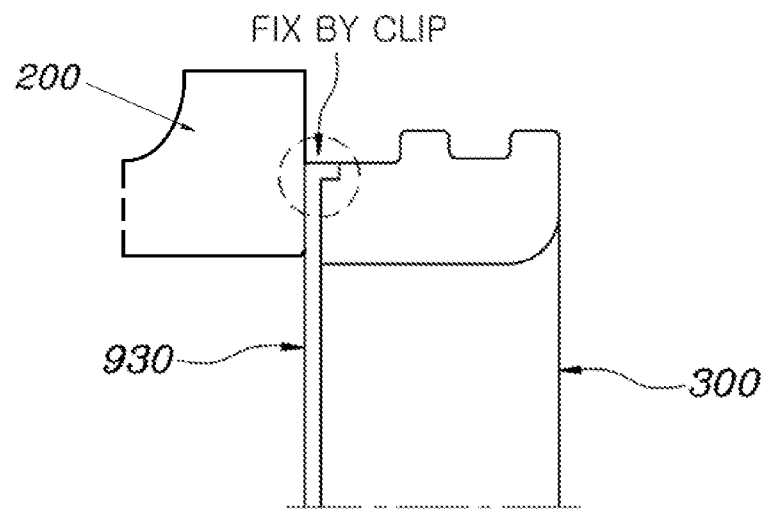
FIG. 8 is a view exemplarily illustrating a low friction washer fixed to a pre-load ring by a clip method in a hub built-in type constant velocity apparatus according to various exemplary embodiments of the present invention.
Figure 9:
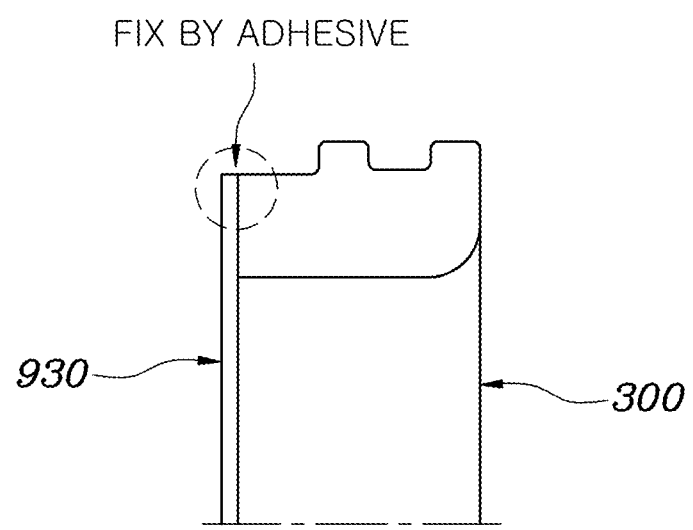
FIG. 9 is a view exemplarily illustrating a low friction washer fixed to a pre-load ring through an adhesive in a hub built-in type constant velocity apparatus according to various exemplary embodiments of the present invention.

Meanwhile, to prevent rotation of the pre-load ring 300 by a load rotational force of the internal race 200, it is necessary to reduce a frictional force between the internal race 200 and the pre-load ring 300. In various exemplary embodiments of the present invention, to reduce the frictional force between the internal race 200 and the pre-load ring 300, a low friction washer 930 may be located between the internal race 200 and the pre-load ring 300. Here, the low friction washer 930 may be fixed to the pre-load ring 300, and here, the low friction washer 930 may be fixed to the pre-load ring 300 by a clip method as illustrated in FIG. 8 according to various exemplary embodiments of the present invention, or the low friction washer 930 may be fixed to the pre-load ring 300 by a bonding method through an adhesive or the like as illustrated in FIG. 9 according to another exemplary embodiment of the present invention.

Figure 11:
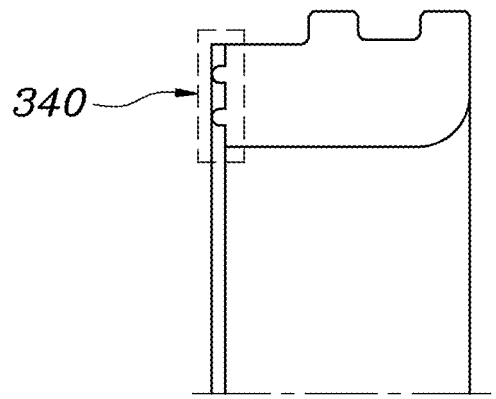
FIG. 11 is a view exemplarily illustrating a low friction structure formed on a surface of a pre-load ring abutting on an internal race in a hub built-in type constant velocity apparatus according to various exemplary embodiments of the present invention.
Figure 12:
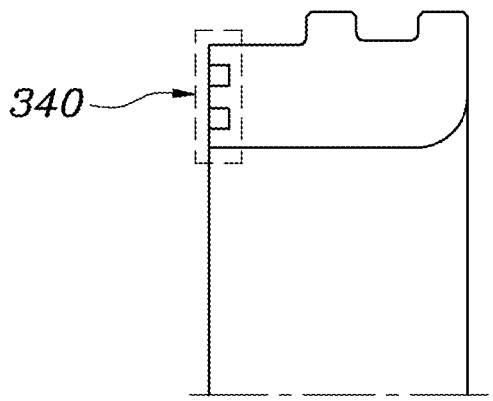
FIG. 12 is a view exemplarily illustrating a low friction structure formed on a surface of a pre-load ring abutting on an internal race in a hub built-in type constant velocity apparatus according to various exemplary embodiments of the present invention.

Meanwhile, a low friction structure 340 for reducing a frictional force with the internal race 200 may be provided on a surface of the pre-load ring 300 abutting on the internal race 200. According to various exemplary embodiments of the present invention, as shown in FIG. 11, a positive projection 340 may be formed on the surface of the pre-load ring 300 abutting on the internal race 200 to reduce a frictional area in contact with the internal race 200, reducing the frictional force between the internal race 200 and the pre-load ring 300. Furthermore, according to another exemplary embodiment of the present invention, as shown in FIG. 12, a negative projection 340 may be formed on the surface of the pre-load ring 300 abutting on the internal race 200, to reduce a frictional area in contact with the internal race 200, reducing a frictional force between the internal race 200 and the pre-load ring 300.

Meanwhile, in various exemplary embodiments of the present invention, the internal race 200 and the pre-load ring 300 may be formed of different materials. According to various exemplary embodiments of the present invention, the internal race 200 may be formed of SUJ2 steel and the pre-load ring 300 may be formed of S45C steel. However, this is only an example and the materials of the internal race 200 and the pre-load ring 300 are not limited thereto.

Figure 13:
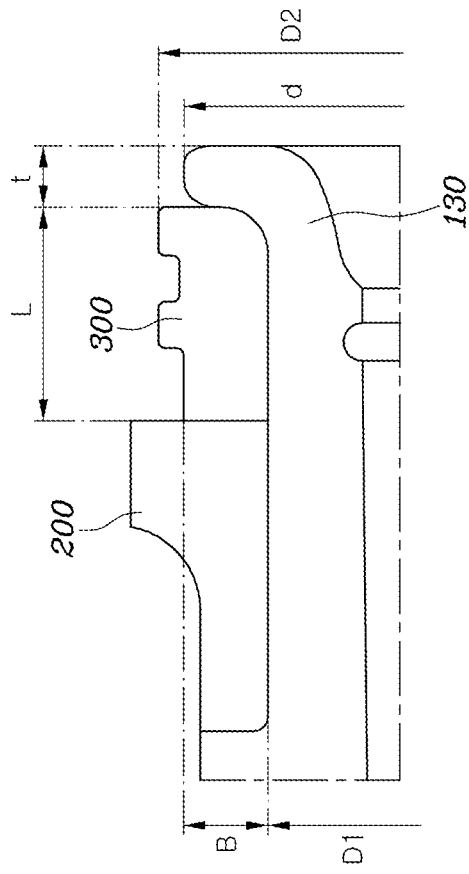
FIG. 13 is a view exemplarily illustrating a numerical relationship among each component in a hub built-in type constant velocity apparatus according to various exemplary embodiments of the present invention.

Referring to FIG. 13, in a hub built-in type constant velocity apparatus 400 according to various exemplary embodiments of the present invention, for the assemblability of the boot 500 and sealing properties of the boot 500, a value obtained by dividing an outermost diameter of the pre-load ring 300 by an external diameter of the forming portion 130 may be 0.8 to 1.2.

Here, if the value obtained by dividing an outermost diameter of the pre-load ring 300 by the external diameter of the forming portion 130 is less than 0.8 or greater than 1.2, a difference between the top portion of the pre-load ring 300 and the top portion of the forming portion 130 may increase by a predetermined interval or greater, and in the instant case, the assemblability of the boot 500 to be mounted to the top portion of the pre-load ring 300 and the top portion of the forming portion 130 may be lowered and sealing properties of the boot 500 may deteriorate as the boot 500 is not securely mounted.

Furthermore, in the hub built-in type constant velocity apparatus 400 according to various exemplary embodiments of the present invention, to prevent deformation of the internal race 200 and the occurrence of cracks on the internal face 200, a value obtained by dividing a thickness of the pre-load ring 300 by a thickness of the forming portion 130 may be 1.2 to 1.6.

Furthermore, to optimally maintain a pre-load force applied to the internal race 200, a value obtained by dividing an internal diameter of the pre-load ring 300 by a total length of the pre-load ring 300 may be 5 to 7, and a value obtained by dividing an external diameter of the forming portion 130 by an internal diameter of the pre-load ring 300 may be 1.1 to 1.4.

According to various exemplary embodiments of the present invention, by integrating the hub housing and the external race of the constant velocity joint, a noise problem that occurs between the boundary portions at the time of moving forwards and backwards may be improved, a hub nut engagement problem may be improved, and by reducing the number of components, a weight may be reduced and a driving mileage may be improved.

Furthermore, a driving performance may be improved through improvement of an articulate angle by reducing a distance between the wheel center portion and the center portion of the constant velocity joint.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hub built-in type constant velocity apparatus comprising:
    a hub housing with a constant velocity joint coupled inwardly;
    an internal race coupled to an external circumferential surface of the hub housing; and
    a pre-load ring coupled to the external circumferential surface of the hub housing and located on a side of the internal race,
    wherein an end portion of the hub housing is formed to be rolled upwards toward the pre-load ring to form a forming portion coupled to the pre-load ring for applying pressure to the pre-load ring and the internal race, and
    wherein a washer is located between the internal race and the pre-load ring.

2. The hub built-in type constant velocity apparatus of claim 1, further including:
    a boot coupled to an external circumferential surface of the pre-load ring,
    wherein a coupling structure is formed on each of the external circumferential surface of the pre-load ring and an internal circumferential surface portion of the boot coupled with the pre-load ring.

3. The hub built-in type constant velocity apparatus of claim 2,
    wherein the boot is accommodated on the external circumferential surface of the pre-loading ring and an upper end portion of the forming portion.

4. The hub built-in type constant velocity apparatus of claim 3,
    wherein a sealing portion is formed in at least one of a direction of one surface of the forming portion and a direction of a surface on which the pre-loading ring and the forming portion are in contact with each other inside the boot.

5. The hub built-in type constant velocity apparatus of claim 4, wherein the sealing portion includes:
    a first sealing portion extending in an axial direction of the pre-load ring from a surface of the boot abutting on a side surface of the forming portion inside the boot and formed to abut on the side surface of the forming portion; and
    a second sealing portion formed inwards from an interior of the boot and extending toward a point in which the pre-load ring and the forming portion are in contact with each other.

6. The hub built-in type constant velocity apparatus of claim 2, wherein a protrusion is formed on the external circumferential surface of the pre-load ring along the external circumferential surface of the pre-load ring or on an internal surface of the boot.

7. The hub built-in type constant velocity apparatus of claim 1, wherein a plurality of teeth is formed on an internal circumferential surface of the pre-load ring to prevent the pre-load ring from rotating on the external circumferential surface of the hub housing.

8. The hub built-in type constant velocity apparatus of claim 1, wherein the washer is fixed to the pre-load ring.

9. The hub built-in type constant velocity apparatus of claim 1, wherein the internal race and the pre-load ring are formed of different materials.

10. The hub built-in type constant velocity apparatus of claim 1, wherein a value obtained by dividing an outermost diameter of the pre-load ring by an external diameter of the forming portion is 0.8 to 1.2.

11. The hub built-in type constant velocity apparatus of claim 1, wherein a value obtained by dividing a thickness of the pre-load ring by a thickness of the forming portion is 1.2 to 1.6.

12. The hub built-in type constant velocity apparatus of claim 1, wherein a value obtained by dividing an internal diameter of the pre-load ring by a total length of the pre-load ring is 5 to 7.

13. The hub built-in type constant velocity apparatus of claim 1, wherein a value obtained by dividing an external diameter of the forming portion by an internal diameter of the pre-load ring is 1.1 to 1.4.

14. A hub built-in type constant velocity apparatus comprising:
    a hub housing with a constant velocity joint coupled inwardly;
    an internal race coupled to an external circumferential surface of the hub housing; and
    a pre-load ring coupled to the external circumferential surface of the hub housing and located on a side of the internal race,
    wherein an end portion of the hub housing is formed to be rolled upwards toward the pre-load ring to form a forming portion coupled to the pre-load ring for applying pressure to the pre-load ring and the internal race, and wherein a low friction structure for reducing a frictional force with the internal race is provided on a surface of the pre-load ring abutting on the internal race.

15. The hub built-in type constant velocity apparatus of claim 14, wherein the low friction structure includes a positive projection formed on the surface of the pre-load ring abutting on the internal race to reduce a frictional area in contact with the internal race.

16. The hub built-in type constant velocity apparatus of claim 14, wherein the low friction structure includes a negative projection formed on the surface of the pre-load ring abutting on the internal race.

17. A hub built-in type constant velocity apparatus comprising:
- a hub housing with a constant velocity joint coupled inwardly;
- an internal race coupled to an external circumferential surface of the hub housing; and
- a pre-load ring coupled to the external circumferential surface of the hub housing and located on a side of the internal race, wherein an end portion of the hub housing is formed to be rolled upwards toward the pre-load ring to form a forming portion coupled to the pre-load ring for applying pressure to the pre-load ring and the internal race, wherein a first seating portion on which the internal race is accommodated and a second seating portion on which the pre-load ring is accommodated are provided on the external circumferential surface of the hub housing, wherein a step is formed between the first seating portion and the second seating portion, wherein a step is formed in a portion of the pre-load ring in contact with the internal race, and wherein the step formed in the pre-load ring corresponds to the step formed between the first seating portion and the second seating portion.

* * * * *